Figure 1:
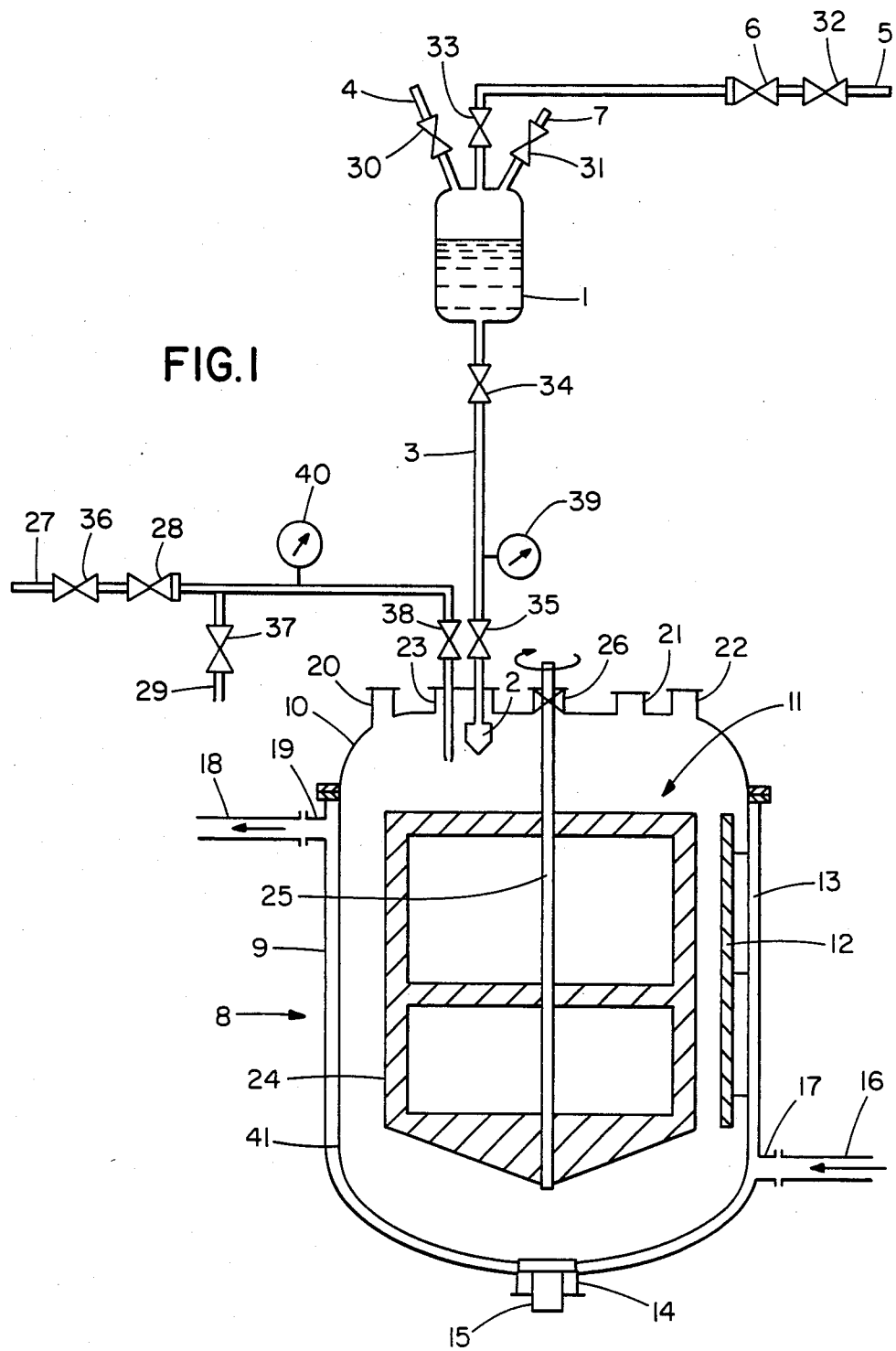

United States Patent [19]

Laroche et al.

[11] Patent Number: 4,732,784

[45] Date of Patent: Mar. 22, 1988

[54] PROCESS FOR TREATING A POLYMERIZATION REACTOR

[75] Inventors: Paul Laroche, Saint-Auban; Jean-Bernard Pompon, deceased, late of Saint-Auban; by Marvonne Pompon, heir, Gap; by Laurence Pompon, heir, Paris; by Christophe Pompon, heir, Marseille; by Lucie Pompon, heir, Gap, all of France

[73] Assignee: Atochem, Paris, France

[21] Appl. No.: 495,953

[22] Filed: May 19, 1983

[30] Foreign Application Priority Data

May 19, 1982 [FR] France .................. 82 08756

[51] Int. Cl.$^4$ .................. B05D 5/08; C08L 93/04
[52] U.S. Cl. .................. 427/230; 427/237; 427/335; 526/62
[58] Field of Search .............. 427/230, 237, 335, 239; 526/62

[56] References Cited

U.S. PATENT DOCUMENTS

| 4,263,421 | 3/1981 | Jones | 526/62 |
| 4,267,291 | 5/1981 | Jones | 427/237 |

FOREIGN PATENT DOCUMENTS 080055 2/1971 U.S.S.R. .................. 427/237

Primary Examiner—Sam Silverberg
Attorney, Agent, or Firm—McDougall, Hersh & Scott

[57] ABSTRACT

An aqueous coating solution is sprayed into the interior of the reactor. After the aqueous coating solution has been sprayed, steam is injected and condensed within the reactor. Upon polymerizing a vinyl chloride-base monomer composition in the reactor after having been treated, the formation of deposits of polymer on the internal surfaces of the reactor is substantially reduced and even suppressed.

16 Claims, 2 Drawing Figures

PROCESS FOR TREATING A POLYMERIZATION REACTOR

The present invention concerns a process for treating a polymerisation reactor. It also concerns the polymerisation reactor when treated by that process.

An aim of the present invention is substantially to reduce the formation of deposits of polymer on the internal surfaces of a polymerisation reactor when a vinyl chloride-base monomer composition is polymerised in the reactor.

Other aims and advantages will be clearly apparent from the following description.

The expression "vinyl chloride-base monomer composition" or, more briefly, "monomer composition" is used herein to denote vinyl chloride alone or in a mixture with at least one other monomer which is copolymerisable with vinyl chloride. The vinyl chloride-base monomer composition contains at least 70% by weight of vinyl chloride. The copolymerisable monomers are those that are generally employed in conventional vinyl chloride copolymerisation methods. Reference may be made to vinyl esters of mono- and polycarboxylic acids such as vinyl acetate, propionate and benzoate; unsaturated mono- and polycarboxylic acids such as acrylic, methacrylic, maleic, fumaric and itaconic acids as well as their aliphatic, cycloaliphatic and aromatic esters, their amides and their nitriles; alkyl, vinyl and vinylidene halides; alkyl vinyl ethers; and olefins.

The expression "polymerisation reactor" or, more briefly, "reactor", is used herein to denote the whole of the pieces of equipment which define the volume that, in the course of polymerisation, is occupied by the various phases which participate in the reaction. The polymerisation reactor essentially comprises a polymerisation vessel which is provided with one or more agitators and one or more deflectors and possibly one or more condenser coolers. The polymerisation vessel and possibly the agitator or agitators and the deflector or deflectors are provided with a chamber for the circulation of cooling fluid. The condensers, the purpose of which is to extract from the reaction medium part of the heat produced by the polymerisation reaction essentially comprise a chamber for condensing the vapours produced by the reaction medium in the polymerisation vessel and one or more cooling fluid circulation chambers.

Various polymerisation processes are usually carried out in the reactor. In many cases, in the course of the polymerisation reaction the processes give rise to undesirable deposits of polymer on the internal surfaces of the reactor, that is to say, on the one hand, on the surfaces of the inside wall of the polymerisation vessel and possibly of the condensation chamber of the condenser cooler or coolers and, on the other hand, on the exposed surfaces of the interior of the reactor such as the surfaces of the one or more agitators and the one or more deflectors. Those deposits not only interfere with the transfer of heat from the interior to the exterior of the reactor but they also reduce the level of productivity and have an adverse effect on the quality of the polymer.

That problem is particularly serious in the industrial production of vinyl chloride polymers, in the form of individual particles, by polymerisation of a monomer composition in a state of aqueous microsuspension. When such a polymerisation procedure is used, the vinyl chloride and any other monomers are maintained in an agitated condition, in the presence of surface active agents and possibly one or more seeding substances. Once the reaction is concluded, the resulting polymer is dried. Such aqueous microsuspension polymerisation reactions are usually performed under pressure in metal reactors which, as the polymerisation vessel, comprise an autoclave provided with one or more agitators and one or more deflectors and possibly one or more condenser coolers. In the course of the polymerisation reaction, vinyl chloride polymer forms deposits on the internal surfaces of the reactor. It is evidently necessary to remove those polymer deposits as they in turn cause other polymer deposits to be formed on the internal surfaces of the reactor, thus resulting in the formation of a crust which is detrimental to the transfer of heat and which causes contamination of the polymer formed.

The nature of the polymer deposit on the internal surfaces of the reactor is such that, in industrial production of the polymers as described hereinbefore, the general practice in the past was to open the reactor and manually scrape at the deposits of polymer on the walls, agitators and deflectors. Such an operation is not only expensive but also constitutes a health hazard for the operator. Various processes have already been proposed, for removing the deposits of polymer from the polymerisation reactor surfaces, in particular operations which involve cleaning by means of solvents, by using high-pressure hydraulic means (at pressures of 300 to 400 bars), and by mechanical means, but no process has been found to be both perfectly effective and economically attractive.

It has also been proposed that aqueous coating solutions may be applied to the internal surfaces of the polymerisation reactor in order to prevent polymer from being deposited on such surfaces. For that purpose, it has already been proposed that an aqueous coating solution be sprayed in the interior of the polymerisation reactor. However, the results obtained hitherto are far from being satisfactory, for the following reasons: on the one hand, not all the parts of the internal surfaces of the reactor where polymer deposits are likely to form are reached by the aqueous coating solution and on the other hand, on the parts which are so reached, the solution forms a layer which is highly irregular in thickness and which comprises independent droplets, of a diameter of from about 1 to 5 mm, irregularly distributed over said parts of said surfaces.

The process according to the present invention does not suffer from that disadvantage.

In accordance with the process of the invention, an aqueous coating solution is sprayed inside the polymerisation reactor.

According to the process of the invention, steam is injected and condensed in the interior of the polymerisation reactor, after the operation of spraying the aqueous coating solution.

The applicants have found in fact that, by effecting injection and condensation of steam within the polymerisation reactor, all the parts of the internal surfaces of the reactor where polymer deposits are likely to be formed are covered with a layer of regular thickness of the aqueous coating solution. The applicants found that, when a suitable aqueous coating solution is used in accordance with the invention, the formation of polymer deposits on the internal surfaces of the polymerisation reactor when a vinyl chloride-base monomer composition is polymerised in the reactor is substantially reduced and even suppressed.

The aqueous coating solution used may be any aqueous solutions containing a coating or covering substance, which are usually employed for coating the internal surfaces of polymerisation reactors, for the purpose of substantially reducing the formation of deposits of polymer on said surfaces when a vinyl chloride-base monomer composition is polymerised in such reactors.

In particular, the aqueous coating solution used may advantageously be a solution containing resin extracted from pine wood, as described in the present applicants' French patent application No. 82 05143. The expression "resin extracted from pine wood" is used to denote the resin which remains after separation of pine oil, turpentine and rosin from the extract of pine wood which is produced by means of a solvent which is capable of extracting rosin and resinous substances other than rosin from pine, in a cold mode of operation. Such a solvent may be for example a hydrocarbon extracted from coal tar such as benzol, toluol or xylol. The resin may be prepared by the processes described in U.S. Pat. No. 2,193,026. The solution generally contains from 1 to 10% and preferably from 2 to 5% by weight of pine wood-extracted resin. It comprises an aqueous alkali metal hydroxide solution. The amount of aqueous coating solution to be sprayed within the reactor is generally such that the resin extracted from pine wood represents from 0.2 to 2 g per m² of the internal surfaces of the reactor.

It is also possible advantageously to use an aqueous coating solution containing modified rosin such as that described in the present applicants' French patent application No. 81 12579. Rosin is a complex mixture primarily containing resinic acids. Resinic acids are monocarboxylic acids having the general formula $C_{20} H_{30} O_2$, among which particular mention may be made of acids of abietic type and acids of pimaric type. The molecules of resinic acids have two chemically reactive centres, the double bonds and the carboxyl group. The term "modified rosin" is used to denote any derivative and mixture of derivatives of rosin which are produced by reactions involving the double bonds of the abietic type acids. Examples of modified rosin that may be mentioned include in particular rosin modified by maleic anhydride, rosin modified by fumaric acid, hydrogenated rosin, dismuted rosin produced by dehydrogenation reaction, and polymerised rosin. The solution generally contains from 1 to 10% and preferably from 2 to 5% by weight of modified rosin. It comprises an aqueous alkali metal hydroxide solution. The amount of aqueous coating solution to be sprayed in the interior of the reactor is generally such that the modified rosin represents from 0.2 to 2 g per m² of the internal surfaces of the reactor.

The step of spraying the aqueous coating solution within the reactor is generally performed by means of at least one full cone type nozzle connected to a supply circuit. The nozzle is usually supplied with aqueous coating solution by propelling the solution through the supply circuit by means of a pump or by means of a propellant fluid which is inert with respect to the aqueous coating solution. The propellant fluid is generally a gas such as air, nitrogen or steam. The spraying nozzle or nozzles are introduced into the reactor or permanently mounted at suitable points therein, so as to be capable of reaching the major part of the internal surfaces of the reactor where polymer deposits are likely to form.

The value of the spraying pressure, which depends on the composition of the aqueous coating solution, the nozzle or nozzles used, the number thereof and the arrangement thereof in the reactor, is advantageously so controlled as to reach the major part of the internal surfaces of the reactor where deposits of polymer are likely to be formed. It is generally from 1 to 5 bars. However, when steam is used as the propellant fluid, as the temperature of steam increases in proportion to increased pressure thereof, the pressure must not be higher than the value above which there is the danger that the aqueous coating solution may display the beginnings of degradation. In the case of aqueous coating solutions containing resin extracted from pine wood or modified rosin as described hereinbefore, the steam pressure is preferably less than 4 bars. The period of time for which the aqueous coating solutions are sprayed at a pressure of 3 bars is generally from 30 to 120 seconds.

The step of injecting steam in the reactor after the step of spraying the aqueous coating solution is generally performed at a pressure of from 1 to 5 bars. It is carried out at one or more suitable points therein, so as to be able to reach all the parts of the internal surfaces of the reactor, where there is a likelihood of polymer deposits being formed. When a propellant fluid is used to supply the spray nozzle or nozzles with the aqueous coating solution, this step may be carried out by way of the spraying circuit. It may be performed in any case by way of a partially or totally independent circuit. The amount of steam condensed must be sufficient to cause the aqueous coating solution to spread out over the parts of the internal surfaces of the reactor where polymer deposits are likely to form. It must not be excessively large, in order not to cause excessive entrainment of the aqueous coating solution over those surfaces, so that, after the injection step, there is a sufficient amount of coating substance, in accordance with the aim sought, at every point of the internal surfaces of the reactor where there is a likelihood of polymer deposits being formed. In accordance with the process of the invention, the amount of steam condensed inside the reactor, after the aqueous coating solution has been sprayed therein, represents from 15 to 35 mg per m² of the internal surfaces of the reactor.

In order to produce the desired amount of condensed steam, it is possible to act on the amount of steam injected and the temperature of the cooling surface. The expression "cooling surface" is used herein to denote the part or parts of the internal surfaces of the reactor which are subjected to cooling. The cooling surface area generally represents of the order of 90% of the internal surfaces of the reactor. All other things being equal, the amount of condensed steam increases as the amount of steam injected is increased and the temperature of the cooling surface lowered. It is advantageous for the temperature of the cooling surface to be maintained at a value which is at most equal to 30° C. and which is generally between 15° and 25° C. during the step of injecting steam, by circulating the cooling fluid. By way of example, with a cooling surface temperature of 20° C., the steam condensed within the reactor generally represents about 75% by weight of the steam injected. Temperature control of the cooling surface may be performed at any moment before injection of the steam. The period of time for which steam is injected at a pressure of 3 bars is generally from 30 to 120 seconds.

A description of two embodiments of equipment which are particularly suitable for carrying out the process according to this invention is set out below by way of example and with reference to FIGS. 1 and 2 of sheets I and II of drawing attached.

Figure 2:
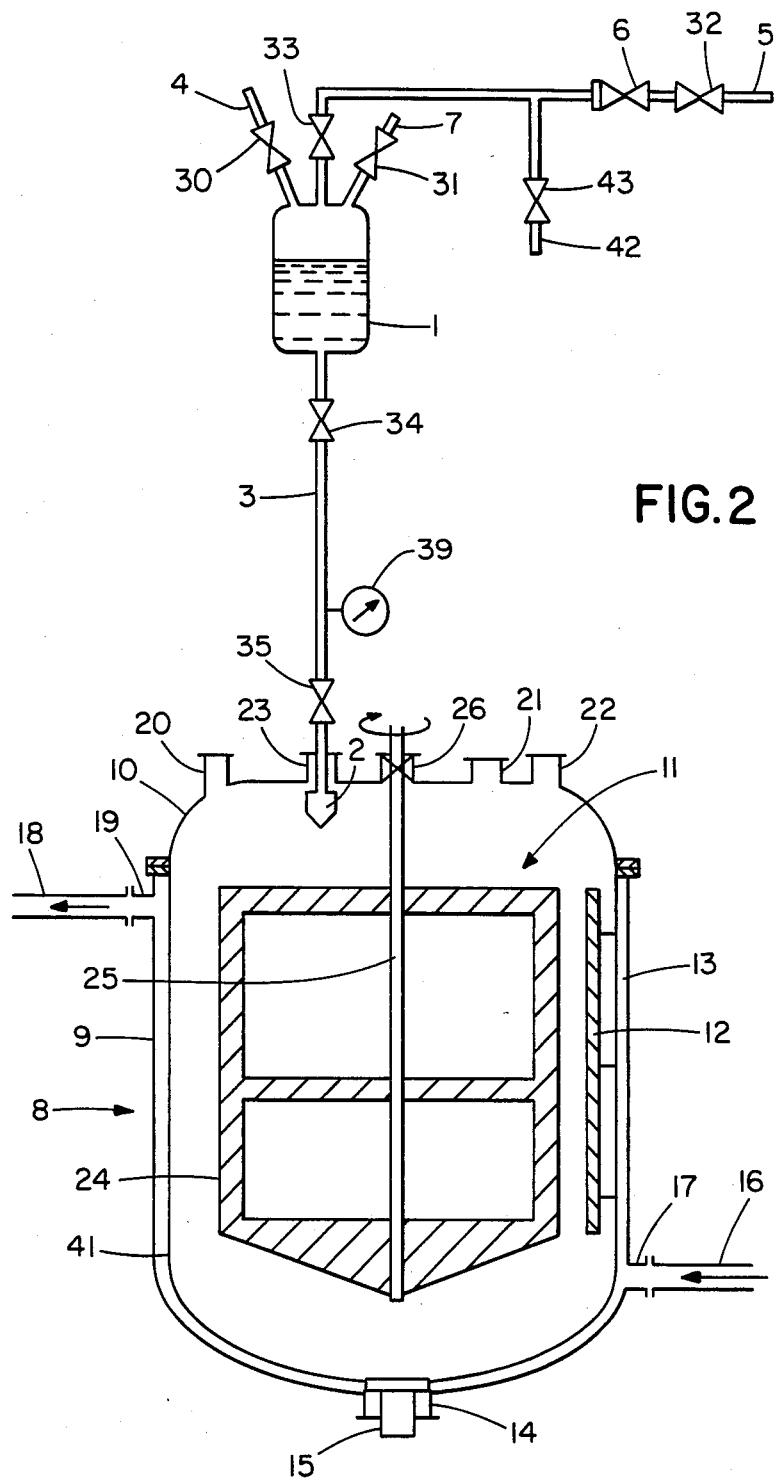

FIGS. 1 and 2 are vertical cross-sectional views of a polymerisation reactor and the apparatus used for treating the reactor.

Referring to FIG. 1, the apparatus comprises two totally independent circuits. One circuit which is supplied with gas is provided to carry out the step of spraying the aqueous coating solution, using the gas as a propellant fluid. The other circuit which is supplied with steam serves to inject steam after the operation of spraying the aqueous coating solution.

Referring to FIG. 2, the apparatus illustrated therein comprises a single circuit. The circuit which is supplied with steam serves to carry out both the aqueous coating solution spraying step, using the steam as the propellant fluid, and the steam injection step after the aqueous coating solution has been sprayed in the reactor.

As shown in FIGS. 1 and 2, the apparatus comprises a tank 1 containing the amount of aqueous coating solution to be sprayed and a full cone type spray nozzle 2 connected to the tank 1 by a conduit 3. The tank 1 is connected in its upper part to a source (not shown) of aqueous coating solution by means of the conduit 4 and to a propellant fluid source (not shown) by a conduit 5 provided with an expansion valve 6. An air venting conduit 7 is connected to the tank 1.

Referring to FIGS. 1 and 2, the polymerisation reactor comprises a polymerisation vessel 8 which essentially comprises a tank 9 and a cover 10 and which is provided with a frame or skeleton-type agitator 11, a deflector 12 and a cooling fluid circulating chamber 13. The tank 9 is provided in its lower portion with a duct 14 controlled by a valve 15 for emptying the polymerisation reactor. The cooling fluid circulation chamber 13 of the polymerisation vessel 8 is connected to a source (not shown) of cooling fluid by the conduit 16 connected to the intake pipe 17. A discharge conduit 18 is connected to the outlet pipe 19 of the cooling fluid circulating chamber 13. In its upper part, the cover 10 comprises a pipe 20 intended for loading the vessel with the monomer or monomers, a pipe 21 for loading the other ingredients necessary for the polymerisation operation, a pipe 22 for degassing the unreacted monomer composition at the end of the polymerisation operation and a pipe 23 for introducing the spray nozzle 2. The frame assembly 24 of the agitator 11 is fixed to a rotary shaft 25 which passes through the cover 10 along the centre line of the polymerisation vessel 8, a stuffing box or gland 26 being provided to form a seal between the rotary shaft 25 and the cover 10.

As shown in FIG. 1, the apparatus comprises an independent conduit 27 for the supply of steam (from a source that is not shown in the drawing), the conduit 27 being constricted at its downstream end and opening by way of the pipe 23 and being provided with an expansion valve 28 and a purge means 29. The apparatus also comprises shut-off valves 30, 31, 32, 33, 34, 35, 36, 37 and 38 and pressure gauges 39 and 40.

With the apparatus shown in FIG. 1, the process is performed in the following manner; with the valve 35 being closed, the valves 33 and 34 are closed, the valves 30 and 31 are opened, the amount of aqueous coating solution to be sprayed is introduced into the tank 1 and the valves 30 and 31 are closed. The pressure of the expansion valve 6 is adjusted to the selected value, the valve 32 is opened, and then the valves 33, 34 and 35 are opened in that order. After about 60 seconds, the valves 32 and 35 are closed. The temperature of the cooling surface 41 having been previously taken to and held at the selected value by circulating the cooling fluid, the pressure of the expansion valve 28 is adjusted to the selected value, the valve 38 is closed, the valve 36 is opened, and purging is effected for about 30 seconds, by opening the valve 37. The valve 37 is closed and the valve 38 is opened. After about 60 seconds, the valves 36 and 38 are closed and purging is effected for about 30 seconds by opening the valve 37.

Referring to FIG. 2, the propellant fluid feed conduit 8, such fluid also being steam, is provided with a purge means 42. The apparatus also comprises the shut-off valves 30, 31, 32, 33, 34, 35 and 43 and the pressure gauge 39.

With the apparatus shown in FIG. 2, the process is performed in the following manner: the valve 35 being closed, the valves 33 and 34 are closed, the valves 30 and 31 are opened, the amount of aqueous coating solution to be sprayed is introduced into the tank 1, and the valves 30 and 31 are closed. The temperature of the cooling surface 41 having been previously taken to and held at the selected value by circulating the cooling fluid, the pressure of the expansion valve 8 is adjusted to the selected value, the valve 32 is opened and purging is effected for about 30 seconds, by opening the valve 43. The valve 43 is closed and the valves 33, 34, and 35 are opened. After about 60 seconds, the valves 32 and 35 are closed and purging is effected for about 30 seconds, by opening the valve 43.

Many polymerisations may be performed in a polymerisation reactor after treatment by the process according to the invention, without cleaning the reactor between such operations. In the course of an experiment, more than 200 operations for the polymerisation of vinyl chloride in microsuspension were thus carried out in a reactor which had been treated in accordance with the invention, without the internal surfaces of the reactor having been previously subjected to a surface treatment such as polishing. The reactor comprised a 25 $m^3$ capacity autoclave provided with a frame-type agitator, a deflector and a condenser cooler. The area of the internal surfaces of the reactor was 100 $m^2$ while the cooling surface area was 90 $m^2$. The aqueous coating solution used contained resin extracted from pine wood. The reactor was treated before each polymerisation operation. In the course of the experiment, it was found that the few polymer deposits which were formed on the internal surfaces of the reactor were made friable by the subsequent application of the treatment according to the invention.

Although many operations can be carried out without renewing the reactor treatment, it appeared to be preferable for the treatment to be repeated before each polymerisation operation in order to retain the advantages provided by the process, to the highest degree. When the reactor is to be treated by using the process according to the invention, it is first emptied, and the internal surfaces are flushed with water. After treatment, any excess of coating solution is allowed to discharge from the reactor and passed, if desired, into a recovery system. All the polymerisation ingredients can then be immediately introduced into the reactor, in the usual manner, and the polymerisation operation can begin.

Although the process of the invention, which is concerned with treating a polymerisation reactor and in particular a reactor for polymerisation of a vinyl chloride-base monomer composition, is specifically described in relation to reactors in which the microsuspension polymerisation method is employed, it can also be successfully applied to treating polymerisation reactors in which suspension or emulsion polymerisation methods are performed. Depending on the different methods used, as referred to above, polymerisation of a vinyl chloride-base monomer composition is generally effected at a temperature of from 10° to 90° C. and preferably from 40° to 75° C., and the duration of the polymerisation reaction is generally from 8 to 20 hours.

The following examples are given to illustrate the invention.

EXAMPLE 1

A coating solution containing 35% by weight of resin extracted from pine wood in an aqueous solution containing 1% by weight of sodium hydroxide is prepared with agitation at a temperature of 40° C.

Using an apparatus of the type shown in FIG. 2, 2 kg of the coating solution, under a steam pressure of 3 bars, is sprayed over a period of 45 seconds in the interior of a polymerisation reactor comprising a 25 m$^3$ autoclave provided with a frame-type agitator, a deflector and a cooling fluid circulation chamber. The area of the internal surfaces of the polymerisation reactor, which are polished mechanically, is 50 m$^2$ while the cooling surface area is 45 m$^2$.

By circulating water in the cooling fluid circulation chamber of the autoclave, the cooling surface is set to a temperature of 20° C. and then, by way of the coating solution spraying circuit, 1.2 kg of steam is injected into the reactor, under a pressure of 3.5 bars, over a period of 40 seconds.

The polymerisation reactor, when treated in that manner, is used to perform a seeded microsuspension vinyl chloride polymerisation operation, in accordance with the process described in French Pat. No. 75 13582, which was published under the No. 2 309 569.

For that purpose, the following are introduced into the reactor:

6.9 t of water.

1.18 t of a polyvinyl chloride seeding latex containing 40% by weight dry matter content, previously prepared in the microsuspension mode, containing 1.5%, by weight with respect to the polymer, of lauroyl peroxide.

0.73 t of a polyvinyl chloride seeding latex containing 40.2% content by weight of dry matter, previously prepared in the emulsion mode, and not containing any polymerisation initiator, 0.313 t of an aqueous solution of sodium dodecylbenzenesulphonate containing 10% by weight thereof, and 11.5 t of vinyl chloride.

With the speed of agitation being adjusted to 50 rpm, the reaction mixture is heated to a temperature of 52° C. and maintained at that temperature throughout the polymerisation operation. After 3 hours of polymerisation at a temperature of 52° C., 0.52 t of the 10% by weight aqueous solution of sodium dodecylbenzenesulphonate is added.

After 18 hours of polymerisation at 52° C., a drop in pressure is observed. When the pressure has dropped 2 bars, the unreacted vinyl chloride is degassed and the reactor is emptied.

EXAMPLE 2

A coating solution containing 3% by weight of rosin modified by maleic anhydride in a 1% by weight aqueous solution of potassium hydroxide is prepared, with agitation, at 40° C.

Using an apparatus of the type shown in FIG. 1, 4 kg of the coating solution is sprayed under a nitrogen pressure of 4 bars over a period of 45 seconds within a polymerisation reactor comprising a 25 m$^3$ autoclave provided with an agitator, a deflector, a cooling fluid circulation chamber and a condenser cooler. The area of the unpolished internal surfaces of the polymerisation reactor is 100 m$^2$ and the cooling surface area is 90 m$^2$.

By circulating water in the cooling fluid circulation chambers of the autoclave and the cooler respectively, the cooling surface is set to a temperature of 22° C. and then, by means of an independent circuit, 2.4 kg of steam is injected inside the reactor, at a pressure of 2 bars, over a period of 60 seconds.

The polymerisation reactor, when treated in that manner, is used to perform a seeded microsuspension vinyl chloride polymerisation operation, in accordance with the process described in French patent No. 75 13582, published under the No. 2 309 569.

For that purpose, the following are introduced into the reactor:

6 t of water, 1.18 t of a polyvinyl chloride seeding latex with a 40% by weight content of dry matter, previously prepared in microsuspension and containing 1.5% by weight with respect to the polymer of lauroyl peroxide, 0.73 t of a polyvinyl chloride seeding latex with a 40.2% by weight content of dry matter, previously prepared in emulsion, and not containing any polymerisation initiator, 0.313 t of a 10% by weight aqueous solution of sodium dedecylbenzenesulphonate, 0.565 t of copper sulphate, and 11.45 t of vinyl chloride.

With the speed of agitation being set at 50 rpm, the reaction mixture is heated to a temperature of 52° C. and maintained at that temperature throughout the polymerisation operation. As soon as the mixture is at 52° C., 83 l/h of an aqueous solution containing 0.68 g/l of ascorbic acid is continuously introduced. After 3 hours of polymerisation at 52° C., 0.52 t of the 10% by weight aqueous solution of sodium dedecylbenzenesulphonate is added.

After 16 hours of polymerisation at 52° C., a drop in pressure is observed. When the pressure has dropped 2 bars, the introduction of aqueous solution of ascorbic acid is stopped, the unreacted vinyl chloride is degassed, and the reactor is emptied.

EXAMPLE 3

A coating solution containing 3% by weight of dismuted rosin in a 1% by weight aqueous solution of sodium hydroxide is prepared, with agitation, at a temperature of 40° C.

Using an apparatus of the type shown in FIG. 2, 4.8 kg of the coating solution is sprayed, under a steam pressure of 4.5 bars, over a period of 45 seconds, in a polymerisation reactor comprising a 50 m$^3$ autoclave provided with a frame-type agitator and a deflector.

The mechanically polished internal reactor surfaces are 85 m² in area; the cooling surface area is 70 m².

By circulating water in the cooling fluid circulation chamber of the autoclave, the cooling surface is adjusted to a temperature of 20° C. and then 2 kg of steam, under a pressure of 3 bars, is injected in the reactor over a period of 60 seconds by way of the coating solution spraying circuit.

The polymerisation reactor, when treated in that manner, is used to carry out a seeded microsuspension vinyl chloride polymerisation operation, in accordance with the process described in French Pat. No. 75 13582, published under the No. 2 309 569. For that purpose, the following are introduced into the reactor:

13.8 t of water, 2.38 t of a polyvinyl chloride seeding latex with a 40% by weight content of dry matter, previously prepared in microsuspension and containing 1.5% by weight with respect to the polymer of lauroyl peroxide, 14.6 t of a polyvinyl chloride seeding latex with a 40.2% by weight content of dry matter, previously prepared in emulsion, and not containing any polymerisation initiator, 0.625 t of a 10% by weight aqueous solution of sodium dodecylbenzenesulphonate, and 22.9 t of vinyl chloride.

With the speed of agitation being set at 50 rpm, the reaction mixture is heated to 52 C. and maintained at that temperature throughout the polymerisation operation. After 3 hours of polymerisation at 52° C., 1.04 t of the 10% by weight aqueous solution of sodium dodecylbenzenesulphonate is added.

After 16 hours of polymerisation at a temperature of 52° C., a drop in pressure is noted. When the pressure has dropped 2 bars, the unreacted vinyl chloride is degassed and the reactor is emptied.

EXAMPLE 4

A coating solution containing 3% by weight of polymerised rosin, in a 1% by weight aqueous solution of sodium hydroxide is prepared, with agitation, at 40° C.

Using an apparatus of the type shown in FIG. 1, 3 kg of the coating solution is sprayed, under a nitrogen pressure of 4 bars and over a period of 60 seconds, within a polymerisation reactor comprising a 25 m³ autoclave provided with a three-arm impeller type agitator and a deflector. The area of the unpolished internal surfaces of the polymerisation reactor is 50 m² and the cooling surface area is 45 m².

By circulating water in the cooling fluid circulation chamber of the autoclave, the cooling surface is set to a temperature of 25° C. and then 2 kg of steam is injected into the reactor by way of an independent circuit, under a pressure of 4.5 bars, over a period of 45 seconds.

The polymerisation reactor, when treated in that manner, is used to perform an operation for the suspension polymerisation of vinyl chloride.

For that purpose, 11 t of water is introduced into the reactor and the speed of agitation is set at 120 rpm. 6 kg of partially hydrolysed polyvinyl alcohol and 1.6 kg of cyclohexyl peroxydicarbonate are also introduced, and then, after the reactor is closed and put under vacuum, 8 t of vinyl chloride is introduced.

The temperature of the reaction mixture is raised to 64° C., which corresponds to a relative pressure of 10 bars. That temperature is maintained until the relative pressure in the reactor drops to 6.5 bars. The duration of the polymerisation operation at 64° C. is 10 hours.

The unreacted monomer is degassed, and the reactor is emptied.

Comparative Tests A, B, C and D

Tests A, B, C and D respectively correspond to Examples 1, 2, 3 and 4 and each comprise a polymerisation operation. The coating solution, the apparatus and the polymerisation conditions are those used in the above-mentioned Examples but the treatment to which the reactor is subjected simply comprises spraying the coating solution within the reactor, under the same conditions, and consequently does not include any subsequent injection of steam.

After the reactor is emptied and opened, the following observations are made:

In accordance with Examples 1, 2, 3 and 4, total absence of polymer deposits within the reactor.

In accordance with test A, a polymer deposit is present on the internal surfaces of the reactor.

In accordance with test B, there is a layer of polymer which adheres strongly to the internal surfaces of the reactor, in particular the internal wall surface of the condensation chamber of the condenser cooler.

In accordance with test C, there is a polymer deposit, in the form of agglomerates, on the internal surfaces of the reactor.

In accordance with test D, there is a uniform deposit of polymer on the internal surfaces of the reactor.

EXAMPLES 5 TO 8

Examples 5 to 8 each comprise a series of polymerisation operations performed without cleaning the reactor between such operations. The apparatus, the treatment to which the reactor is subjected and the polymerisation conditions are those used in Examples 1, 2, 3 and 4. The reactor is treated before each polymerisation operation.

Comparative Tests E, F, G and H

Tests E, F, G and H correspond respectively to Examples 5, 6, 7 and 8 and each comprise a series of polymerisation operations. The coating solution, the apparatus and the polymerisation conditions are those used in the above-mentioned Examples, but the treatment to which the reactor is subjected comprises merely spraying the coating solution in the reactor, under the same conditions, and consequently does not include any further injection of steam.

In Examples 5, 6, 7 and 8, after more than 300, 200, 250 and 350 polymerisation operations respectively, no drop in the heat transfer coefficient of the reactor is found.

In tests E, F, G and H, after only 30, 25, 35 and 40 polymerisations respectively, a drop in the heat transfer coefficient of the reactor is noted. In the case of test F, that drop is such that it makes it impossible to continue the polymerisation operations.

At the end of each series of polymerisation operations, after the reactor is emptied and opened, the following observations are made:

In Examples 5, 6 and 8, total absence of polymer deposits within the reactor.

In Example 7, a light deposit of polymer is found to be present on the internal surfaces of the reactor, and is easily removed by subsequent application of the treatment to the reactor.

In tests E, G and H, a deposit of polymer is found on the internal surfaces of the reactor.

In test F, a substantial deposit of polymer is found on the internal surfaces of the reactor, in particular on the internal wall surface of the condensation chamber of the cooler.

In tests, E, F, G, and H, removal of the deposits requires a long and expensive hydraulic cleaning operation which is performed under a high pressure (400 bars).

In test F, removal of the deposits also necessitates dismantling the condenser cooler.

It is claimed:

1. A process for inhibiting the formation of polymer deposits in a polymerisation reactor comprising spraying an aqueous coating solution containing a resin extracted from pine wood within said reactor and than injecting and condensing steam within said reactor.

2. A process according to claim 2 wherein the aqueous coating solution contains from 1 to 10% by weight of resin extracted from pine wood.

3. A process according to claim 2 wherein the aqueous coating solution contains from 2 to 5% by weight of resin extracted from pine wood.

4. A process according to claim 2 wherein the amount of aqueous coating solution to be sprayed within the reactor is such that the resin extracted from pine wood represents from 0.2 to 2 g per m$^2$ of the internal surface areas of said reactor.

5. A process according to claim 1 wherein the aqueous coating solution contains modified rosin.

6. A process according to claim 5 wherein the modified rosin is selected from the group formed by rosin modified with maleic anhydride, rosin modified with fumaric acid, hydrogenated rosin, dismuted rosin and polymerised rosin.

7. A process according to claim 5 wherein the aqueous coating solution contains from 1 to 10% by weight of modified rosin.

8. A process according to claim 5 wherein the aqueous coating solution contains from 2 to 5% by weight of modified rosin.

9. A process according to claim 5 wherein the amount of aqueous coating solution to be sprayed within the reactor is such that the modified rosin represents from 0.2 to 2 g per m$^2$ of the area of the internal surfaces of the reactor.

10. A process according to claim 1 wherein the step of spraying the aqueous coating solution within the reactor is effected by means of at least one full cone type nozzle connected to a feed circuit.

11. A process according to claim 10 wherein the supply of aqueous coating solution to the nozzle is effected by propelling said solution through said circuit by means of a pump.

12. A process according to claim 10 wherein the supply of aqueous coating solution to the nozzle is effected by propelling said solution through said circuit by means of a propellant fluid which is inert with respect to the aqueous coating solution.

13. A process according to claim 12 wherein the propellant fluid is a gas selected from the group formed by air, nitrogen and steam.

14. A process according to claim 1 wherein the step of spraying the aqueous coating solution within the reactor is effected at a pressure of from 1 to 5 bars.

15. A process according to claim 1 wherein the step of injecting steam within the reactor, after the step of spraying the aqueous coating solution, is performed at a pressure of from 1 to 5 bars.

16. A process according to claim 1 wherein the amount of steam condensed within the reactor, after spraying of the aqueous coating solution, represents from 15 to 35 g per m$^2$ of the area of the internal surfaces of the reactor.

* * * * *